(12) United States Patent
Sepulveda

(10) Patent No.: US 8,201,408 B1
(45) Date of Patent: Jun. 19, 2012

(54) BIOMASS (WOODFUEL) COGENERATION POWERPLANT

(76) Inventor: Jose A. Sepulveda, Florissant, MO (US)

( * ) Notice: Subject to any disclaimer, the term of this patent is extended or adjusted under 35 U.S.C. 154(b) by 44 days.

(21) Appl. No.: 12/901,970

(22) Filed: Oct. 11, 2010

(51) Int. Cl.
*F03G 6/00* (2006.01)
(52) U.S. Cl. .................. 60/641.15; 60/641.8; 60/676
(58) Field of Classification Search .... 60/641.8–641.15, 60/670, 676
See application file for complete search history.

(56) References Cited

U.S. PATENT DOCUMENTS

| | | | |
|---|---|---|---|
| 4,670,240 A * | 6/1987 | Barber | 423/322 |
| 5,386,686 A * | 2/1995 | Chretien et al. | 60/783 |
| 5,507,141 A * | 4/1996 | Stigsson | 60/775 |
| 5,797,332 A * | 8/1998 | Keller et al. | 110/226 |
| 7,845,172 B2 * | 12/2010 | Goldman | 60/641.8 |
| 2002/0006969 A1 * | 1/2002 | O'Beck et al. | 518/704 |

* cited by examiner

*Primary Examiner* — Hoang Nguyen
(74) *Attorney, Agent, or Firm* — Grace J. Fishel

(57) ABSTRACT

A sustainable closed loop system with zero waste for cogeneration of electric and thermal energy using woodfuel from a closeby energy plantation of quick growing trees such as Gliricidia Sepium. In addition to the energy plantation sub-system, the system includes a biomass fuel preparing sub-system and a steam and power generation sub-system for use with a biological wastewater treatment sub-system. No chemicals are used for wastewater treatment.

8 Claims, 3 Drawing Sheets

BIOMASS (WOODFUEL) COGENERATION POWERPLANT

BACKGROUND OF THE INVENTION

1. Field of the Invention

The present invention relates to a sustainable closed loop system with zero waste for cogeneration of electric and thermal energy using woodfuel from an energy plantation of quick growing trees.

2. Brief Description of the Prior Art

Transportation costs are a critical factor in the use of wood as fuel because it is bulky for the amount of heat generated. Distances must therefore be kept low to make wood economically attractive as a fuel source. Hence the use of wood as a fuel for the cogeneration of electric and thermal energy has been limited to the forest industries. Mechanical wood processing has the potential to produce both a surplus of heat and electricity and can support other energy deficient conversion processes in an integrated complex, producing, for example, lumber, plywood and particle board or, in rural areas, to supplying energy for the needs of the surrounding community.

While the forest industry has demonstrated that the cogeneration of heat and electricity is possible with wood, there is presently insufficient woodfuel available for it be the other than a very, very minor source of heat and power. Wood is a renewable energy source and therefore attractive but has not been economically competitive with coal, gas and oil except in rare instances.

Prior art power plants do not have zero waste operation and use chemicals for water treatment.

BRIEF SUMMARY OF THE INVENTION

In view of the above, it is an object of the present invention to provide a system for woodfuel cogeneration of electric and thermal energy from biomass harvested from a plantation of quick growing trees such as Gliricidia Sepium. It is another object to provide a system for woodfuel cogeneration of electric and thermal energy which could be located on a border between countries and provide employment and energy for both. Other objects and features of the invention will be in part apparent and in part pointed out hereinafter.

In accordance with the invention, a closed loop system for cogeneration of electric and thermal includes an energy plantation of quick growing trees for providing a source of biomass, a biomass fuel preparation sub-system in close proximity to the energy plantation for drying and reducing the biomass into the desired fuel particles, a steam and power generation sub-system including a solid fuel burner for burning the fuel particles from the biomass fuel preparation sub-system and heating water in a boiler into steam, with the burning of the fuel particles taking place in the solid fuel burner outside of the boiler, a turbine for converting the steam into mechanical energy, a generator for converting the mechanical energy into electrical energy, and a multi-effect distillation unit for producing distilled water for the boiler feed water and other plant usage from the spent exhaust steam from the turbine.

The invention summarized above comprises the system hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1A:
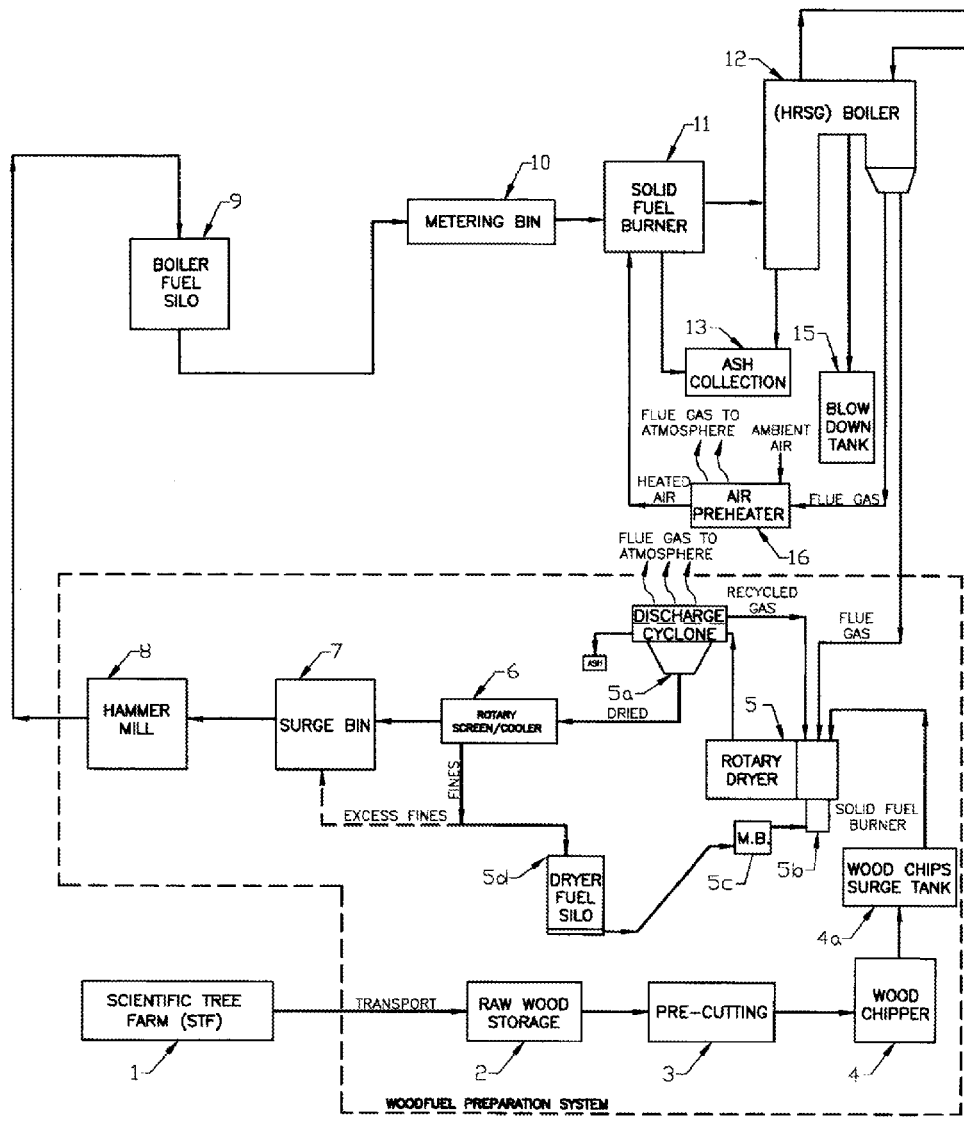
FIG. 1A continued on FIG. 1B (hereinafter referred to as FIG. 1) is a flow chart of a closed loop system for cogeneration of electric and thermal energy; and, FIG. 2 is a flow chart showing a biological wastewater treatment system.
Figure 1B:
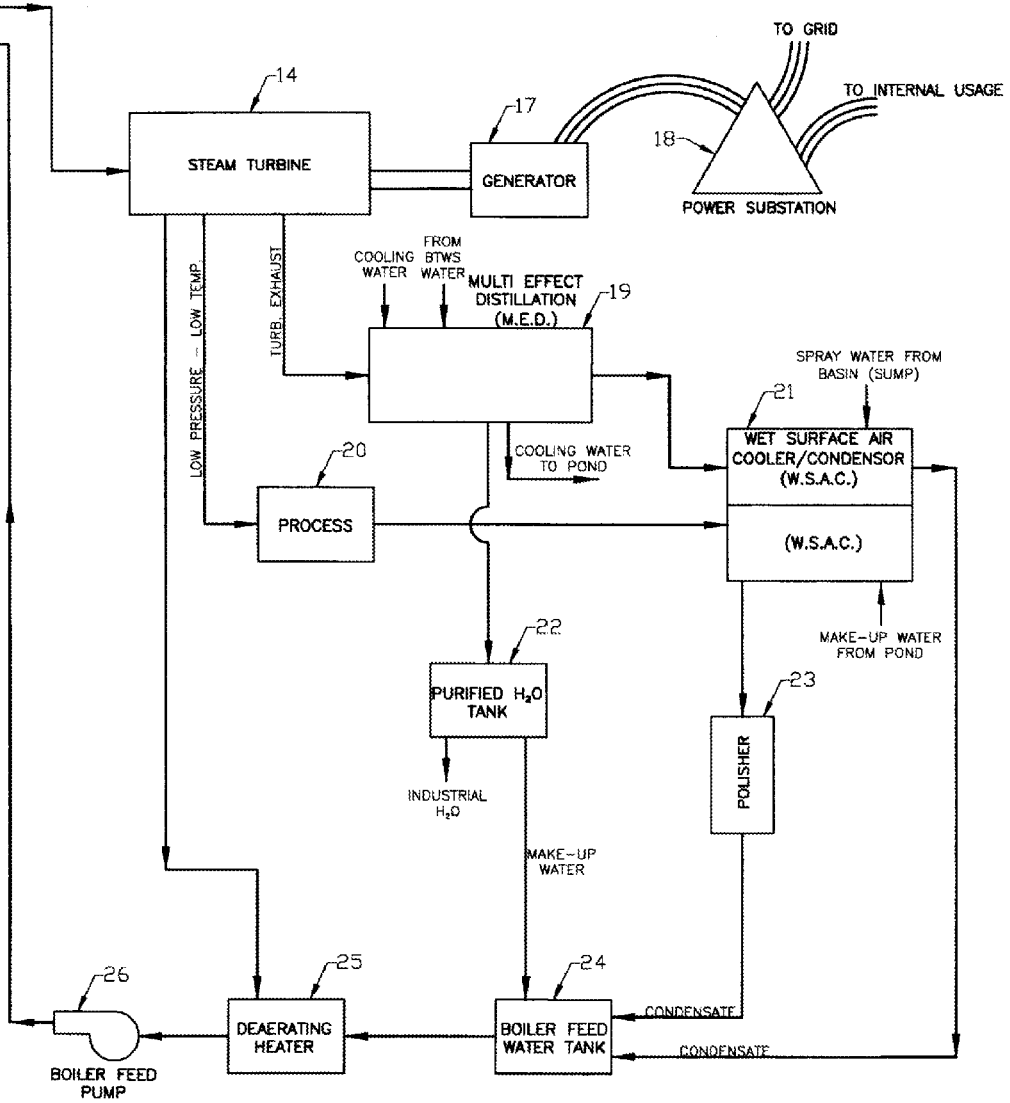
Figure 2:
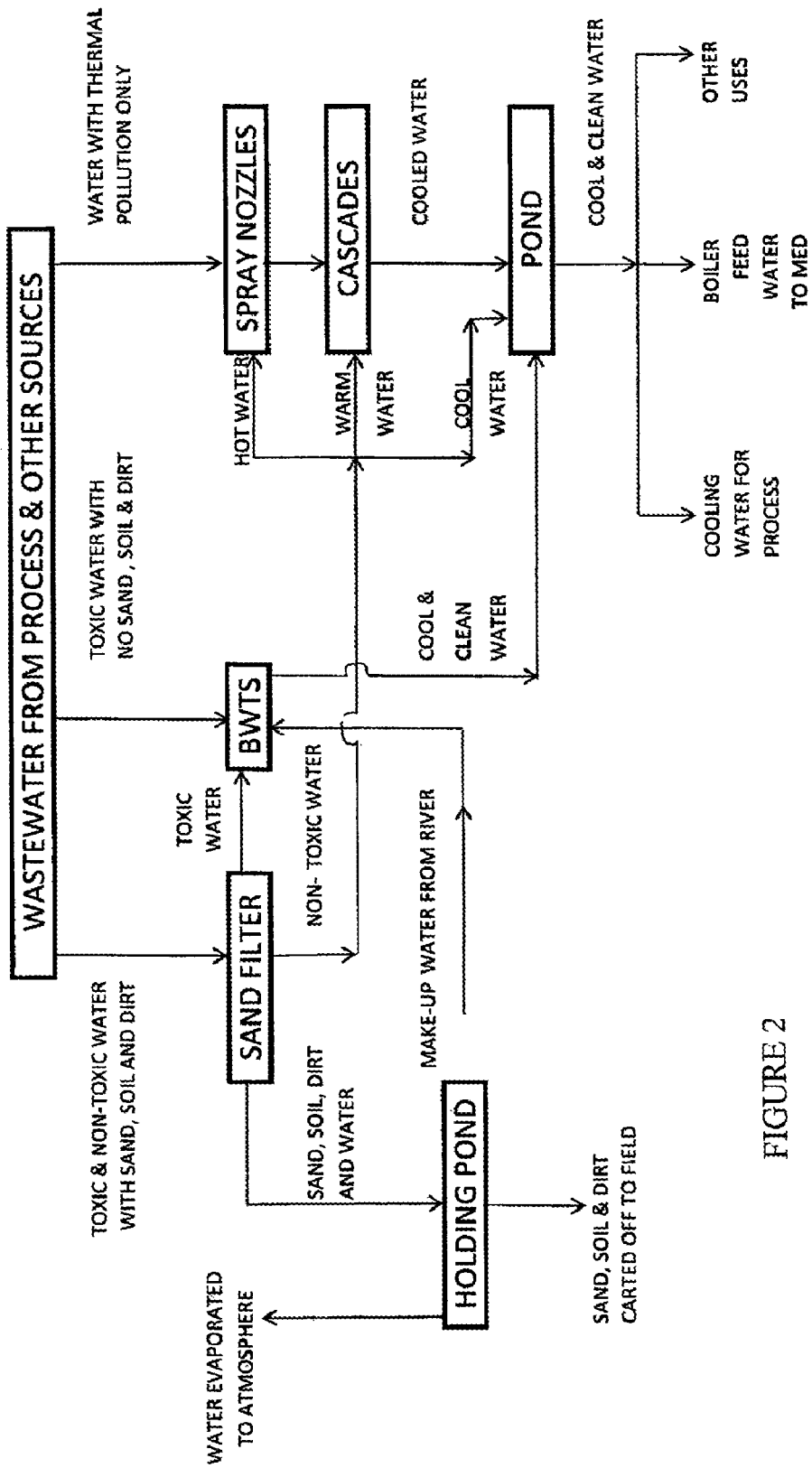

Referring to the drawings more particularly by reference character, a closed loop system for cogeneration of electric and thermal energy (Biomass Cogeneration Powerplant (BMCP) System) is illustrated in FIGS. 1 and 2. In major part, the system includes a Scientific Tree Farm (STF) sub-system, a biomass fuel preparing sub-system (BFPS) and a steam and power generation sub-system, shown in FIG. 1, and an integrated Biological Wastewater Treatment System (BWTS) as shown in FIG. 2.

Scientific Tree Farm (STF) Sub-System

For economic operation of the BMCP System, it is essential that there be a reliable, renewable and continuous source of biomass closeby to keep transportation costs down. As shown in FIG. 1, Scientific Tree Farm (STF) is a energy plantation established close to the Biomass Cogeneration Powerplant. A species of quick growing trees is selected for its value as a fuel with high heat value and compatibility with the soil and climate of the energy plantation. One suitable species, for example, is Gliricidia Sepium (GS) which would grow well along the U.S.-Mexican border on land which is not suitable for other agricultural purposes. Gliricidia Sepium is hardy, fast growing and produces the most biomass and heat (i.e., BTU/acre/year) of all tree species presently identified. Gliricidia Sepium can grow in all types of soil, can be coppiced, is nitrogen-fixing and enriches the soil but other species are also possibly suitable but may not be as efficient.

The STF sub-system makes the closed loop BMCP System a viable, renewable and sustainable energy source. An efficient STF operation ensures a reliable and consistent supply of high BTU biomass fuel for the BMCP System which makes it easer for the BMCP System to achieve sustainability and profitability. Without the STF operation it would be difficult to achieve sustainability of the BMCP System throughout the years. Continuous work will be carried out to improve the biomass production (i.e., tons/acre/year) and heat productions (i.e., BTU/acre/year) of the selected tree specie (i.e., Gliricidia Sepium). For example, work and investigations will be carried out to improve intercropping and composting practices to obtain optimum end results. A well-designed STF Sub-System and its optimal operation is pioneering and is the cornerstone of the BMCP System operation. The STF sub-system is environmentally friendly (i.e., prevents erosion, promotes biodiversity and helps slow climate change).

Biomass Fuel Preparation Sub-System (BFPS)

Biomass fuel preparation sub-system (BFPS) includes a number of steps to provide fuel to the steam and power generation sub-system in a form for combustion efficiency which depends on several factors, namely particle size and moisture content. Wood from the STF (1) is harvested, transported and placed in a raw wood storage (2) near the Biomass Cogeneration Powerplant where it is protected from the elements, air dried to lose some amount of moisture and provides easy material flow.

Wood from raw wood storage (2) is sorted and cut by a chipping machine in pre-cutting step (3). The processed wood from pre-cutting step (3) is cut into thin wood chips in a wood chipper (4) for optimum removal of the moisture in a rotary dryer (5) with intermediate storage in a wood chips surge tank. The use of wood chipper (4) is important to obtain maximum surface area of the material being dried to achieve optimum drying.

Dryer (4) is preferably a rotary, cascading, direct, single cell dehydrating machine. While the wood could be air dried, the use of a fuel dryer is preferred and is made efficient by using waste flue gas from boiler (12), recycled gas from discharge cyclone (5a) and direct combustion of woodfuel produced in the subject system in solid fuel burner (5b) to ensure the proper drying of the wood chips and to achieve the optimal size and volume of the dryer drum. Woodfuel for solid fuel burner (5b) may be stored in dryer fuel silo (5d) and include fines from rotary screen/cooler (6) and surge bin (7). A center fill device is incorporated inside dryer (5) to prolong the residence time of the wood chips inside the dryer to achieve near or complete dehydration.

The use of a rotary, cascading, direct, single shell, center-fill dryer (5) is important to maximize the utilization of the waste heat energy in the flue gas to evaporate moisture from the wood. A supplemental heat source from a small solid fuel burner (5b) is provided to ensure optimum drying. The efficient use of the flue gas or combustion gases from boiler (12) utilizes BTU's of heat energy that would have been lost to the atmosphere. This alone improves boiler efficiency. The use of the flue gas as the drying medium, which is oxygen starved, also prevents fires inside dryer (5), thus providing a safer drying operation.

From dryer (5), the dried chips are discharged to a discharge cyclone (5a) where the fines are separated from the dried chips. A portion of the air from cyclone (5a) is exhausted to the atmosphere and a portion of it is recycled to the dryer. The hot chips from cyclone (5a) are passed through rotary screen/cooler (6) where they are cooled and lose moisture. The use of rotary screen/cooler (6) results in a better dried material. Since the material comes out of the dryer (5) is hot, moisture continues to be evaporated until it is cooled down to ambient temperature. Moisture taken out in the cooler can be as much as 2%. This moisture if not evaporated out can reduce combustion efficiency. Wood fines are separated from the large chips and are recycled to solid fuel burner (5b) for burning. This translates into higher combustion efficiencies, cleaner air and reduced pollution.

The dried particles may be temporarily stored in surge bin (7) to avoid any interruption of the dryer operation when there are problems in the operation of a hammermill (8) in which the chips are reduced to the desired particle size. This step is the final step in the conversion of the raw wood into an efficient biomass fuel. The use of a hammermill (8) in reducing the particle size of the biomass fuel results in better mixing of the oxygen in the air with the biomass fuel particles. This translates to higher combustion efficiencies in the cyclonic, suspension solid fuel burner (11).

The Biomass Fuel Preparation Sub-System (BFPS) is of vital importance to the success of the BMCP System. It is this system that converts the raw wood from the STF Sub-System into a very efficient biomass fuel for the BMCP System. The BFPS Sub-System is similar in function to an oil refinery which converts crude oil into fuel oil for use in power generation systems.

Steam and Power Generation Sub-System

The biomass particles entering steam and power generation sub-system may be stored in a solid biomass fuel storage tank (9). Storage tank (9) is equipped with an efficient bottom unloader for a safe and effective unloading of the biomass fuel to a solid fuel metering device (10) before it is pneumatically conveyed to solid fuel burner (11).

Solid fuel burner (11) is a water tube burner wherein combustion of the biomass takes place outside of boiler (12) which is heated by burner (11). Ashes from solid fuel burner (11) and boiler (12) may be collected and used in a mixture of other materials as a solid conditioner in the STF Sub-System of the BMCP System. Because the biomass is burned outside of boiler (12) and because the makeup water is purified in the Biological Wastewater Treatment System discussed below and in the Multi-Effect Distillation (MED) (19), there will be little debris caught in blow-down tank (15). The flue gas from boiler (12) may be used to preheat the combustion air to solid fuel burner (11) and to rotary dryer (5).

The superheated steam from boiler (12) is used to drive a condensing steam turbine or a condensing extracting steam turbine (14) to generate steam for process and electric power. This is done in generator (17) where the mechanical power of the rotating shaft of the steam turbine (14) is converted into electric power. Power from generator (17) may be distributed by a power substation (18) to the power grid and for internal usage in the system.

A low pressure, low temperature steam exhaust from turbine (14) is utilized in the MED unit (19) to produce distilled water for boiler (12) and for other uses. The purified water is pumped to a purified water tank (22). Additional sources of water for purification in MED unit (19) come from a Biological Wastewater Treatment Sub-System (BWTS) which is discussed below in connection with FIG. 2 and the cooling water from a pond.

The use of the MED unit (19) is important in achieving sustainability, profitability and green operation of BMCP System. The MED unit (19) is a very efficient distillation equipment that produces a substantial amount of distilled water utilizing the spent exhaust steam from the steam turbine (14). The heat energy in the exhaust steam that is used by the MED unit (19) would have been lost to the atmosphere. The distilled water is used as boiler (12) make-up water eliminating the need for a water treatment system and chemicals as are used in conventional water treatment systems for boiler make-up water. Hence the MED unit (19) translates to savings in water treatment chemicals and is environmentally friendly. It also substantially reduced boiler blow-down, extends the life of the boiler (12) and reduces boiler maintenance costs.

Step (20) takes bled steam from turbine (14) and pumps it to a Wet Surface Air Cooler (W.S.A.C.) (21). In W.S.A.C. (21), the steam from the turbine (14) and from MED unit (19) are cooled and condensed. Make up water used for spray cooling is from the pond.

Cooled water from W.S.A.C. (21) is passed to a polisher (23) to remove any impurities in the water. The clean water is then stored in boiler feed water tank (24) together with condensate from W.S.A.C. (21). Water is then passed to deaerating heater (25) where it is combined with water from steam turbine (14). A pump (26) is provided for pumping the water to boiler (12).

Integrated Biological Wastewater Treatment System (BWTS) Sub-System

The fourth sub-system of the BMCP System is crucial in achieving "zero waste" operation. The Biological Wastewater Treatment System (BWTS) will process all toxic and dirty water before it goes to the MED unit (19). The BWTS may utilize water hyacinths or water lilies to metabolize all toxic elements in the water and for those elements (e.g., metals) that cannot be metabolized and absorbed, they will stick to the roots and can be easily collected during harvesting of the plants. There are extensive investigations and studies conducted by NASA which ascertained the effectiveness of water hyacinths in removing toxicity from water and cleaning it. For the removal of sand, soil and dirt, filters are provided before the water is conveyed to the BWTS. The combination of the BWTS and the MED Unit (19) ensure the water purity and quality for BMCP use.

In use, it is seen that the establishment of the STF as an important sub-system of the BMCP System makes it an efficient closed-loop BMCP System, in addition to its large beneficial impact on the environment and economy of the country. If implemented along the U.S.-Mexican border, it can contribute to homeland security. When the BMCP System is implemented along the U.S.-Mexican border, it can generate more than 50,000 MW of electric power that is sustainable, reliable, consistent, profitable and green. This alone will achieve the U.S. government's goal of 25% reduction of carbon dioxide and green house emissions by 2030 and will contribute considerably to the U.S. goal of energy independence and wean the U.S. from its oil addiction.

The innovative design of the Biomass Fuel Preparation Sub-System (BFS) which is equivalent in function to an oil refinery, together with a novel design of the wood fuel-fired burners makes the BMCP System more efficient than any fossil-fired electric generation powerplant.

In view of the above, it will be seen that the several objects of the invention are achieved and other advantageous results attained. As various changes could be made in the above systems without departing from the scope of the invention, it is intended that all matter contained in the above description or shown in the accompanying drawings shall be interpreted as illustrative and not in a limiting sense.

What is claimed:

1. A sustainable closed loop system with zero waste for cogeneration of electric and thermal energy comprising an energy plantation of quick growing trees for providing a source of biomass, a biomass fuel preparation sub-system in close proximity to the energy plantation for drying and reducing the biomass into a fuel particles, a steam and power generation sub-system including a solid fuel burner for burning the fuel particles from the biomass fuel preparation sub-system and heating water in a boiler into steam, said burning of the fuel particles taking place in the solid fuel burner outside of the boiler, a turbine for converting the steam into mechanical energy, a generator for converting the mechanical energy into electrical energy, and a multi-effect distillation unit for producing distilled water from condensed steam from the turbine for recycle to the boiler whereby no chemicals are required for wastewater treatment, said biomass fuel preparation sub-system including a rotary dryer which is preheated with flue gas from the boiler.

2. The closed loop system of claim 1 wherein the solid fuel burner is also preheated with flue gas from the boiler.

3. The closed loop system of claim 1 wherein the biomass fuel preparation sub-system includes a chipper for reducing the biomass into particles to increase the surface area of the matter for better drying prior to induction into the rotary dryer.

4. The closed loop system of claim 3 wherein fuel particles from the dryer are cooled in a screen/cooler to reduce moisture content.

5. The closed loop system of claim 4 wherein the fuel particles from the screen/cooler are further reduced in size in a hammermill to provide better combustion in the solid fuel burner.

6. The closed loop system of claim 1 further including a biological wastewater system for purification of toxic and dirty water in a pond containing hyacinths.

7. The closed loop system of claim 1 wherein the energy plantation of quick growing trees are Gliricidia Sepium trees.

8. The closed loop system of claim 7 wherein the electric energy produced by the generator is provided to the closed loop system for internal use in operating the system or to an electric grid.

* * * * *